(12) United States Patent
Xu et al.

(10) Patent No.: US 9,256,950 B1
(45) Date of Patent: Feb. 9, 2016

(54) DETECTING AND MODIFYING FACIAL FEATURES OF PERSONS IN IMAGES

(71) Applicant: Google Inc., Mountain View, CA (US)

(72) Inventors: Hao Xu, Mountain View, CA (US); Stephen Joseph DiVerdi, Oakland, CA (US); Sevket Derin Babacan, San Francisco, CA (US); Aravind Krishnaswamy, San Jose, CA (US); Tinglin Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/200,000

(22) Filed: Mar. 6, 2014

(51) Int. Cl.
*G06K 9/66* (2006.01)
*G06T 7/00* (2006.01)

(52) U.S. Cl.
CPC .................................. *G06T 7/0081* (2013.01)

(58) Field of Classification Search
CPC . G06K 9/00234; G06K 9/00281; G06K 9/46; G06K 9/00248; G06T 2207/20076
USPC .......................... 382/195, 118, 162–167, 115
See application file for complete search history.

(56) References Cited

U.S. PATENT DOCUMENTS

| | | | |
|---|---|---|---|
| 4,203,671 A | 5/1980 | Takahashi et al. | |
| 6,263,113 B1 | 7/2001 | Abdel-Mottaleb et al. | |
| 6,690,822 B1 | 2/2004 | Chen et al. | |
| 7,587,083 B2 | 9/2009 | Tabata et al. | |
| 7,916,905 B2 | 3/2011 | Yen et al. | |
| 8,218,862 B2 | 7/2012 | Demirli et al. | |
| 8,295,557 B2 | 10/2012 | Wang et al. | |
| 8,311,355 B2 | 11/2012 | Brunner et al. | |
| 8,345,114 B2 | 1/2013 | Ciuc et al. | |
| 8,385,609 B2 | 2/2013 | Piramuthu et al. | |
| 8,406,482 B1 | 3/2013 | Chien et al. | |
| 8,638,993 B2 | 1/2014 | Lee et al. | |
| 8,698,796 B2 * | 4/2014 | Mochizuki | 345/419 |
| 2007/0110305 A1 | 5/2007 | Corcoran et al. | |
| 2009/0041297 A1 | 2/2009 | Zhang et al. | |
| 2011/0299776 A1 * | 12/2011 | Lee et al. | 382/173 |
| 2013/0044947 A1 | 2/2013 | Brandt et al. | |
| 2013/0077823 A1 | 3/2013 | Mestha et al. | |
| 2013/0329995 A1 | 12/2013 | Webb et al. | |

OTHER PUBLICATIONS

Jones, Michael J. et al. "Statistical Color Models with Application to Skin Detection." International Journal of Computer Vision. vol. 46; pp. 81-96. Jan. 1, 2002.

(Continued)

*Primary Examiner* — Manuchehr Rahmjoo
(74) *Attorney, Agent, or Firm* — IP Spring

(57) ABSTRACT

Implementations relate to detecting and modifying facial features of persons in images. In some implementations, a method includes receiving one or more general color models of color distribution for a facial feature of persons depicted in training images. The method obtains an input image, and determines a feature mask associated with the facial feature for one or more faces in the input image. Determining the mask includes estimating one or more local color models for each of the faces in the input image based on the general color models, and iteratively refining the estimated local color models based on the general color models. The refined local color models are used in the determination of the feature mask. The method applies a modification to the facial feature of faces in the input image using the feature mask.

16 Claims, 9 Drawing Sheets

(56) References Cited

OTHER PUBLICATIONS

European Patent Office. International Search Report for Related International Patent Application No. PCT/US2014/037934. 4 pages. Oct. 2, 2014.

Saeed, Usman et al.,"Combining Edge Detection and Region Segmentation for Lip Contour Extraction." AMDO'10 Proceedings of the 6th international conference on Articulated Motion and Deformable Objects. 10 pages. 2010.

* cited by examiner

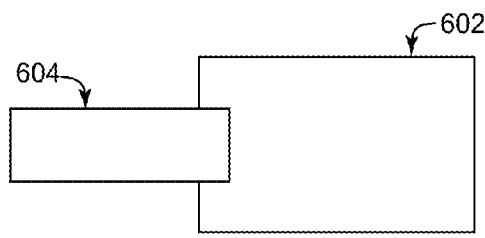
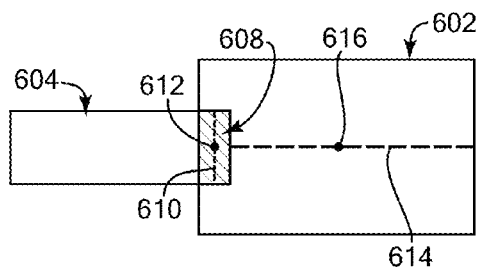
FIG. 6A      FIG. 6B
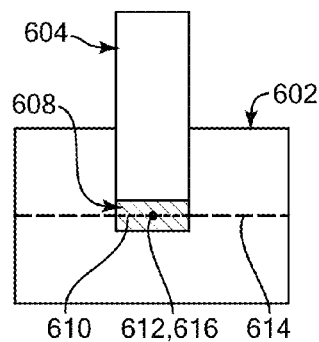
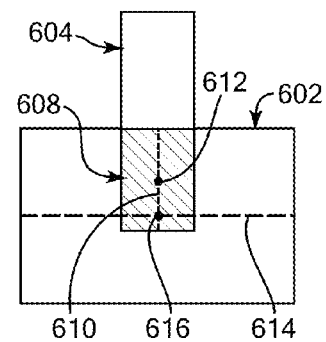
FIG. 7A      FIG. 7B
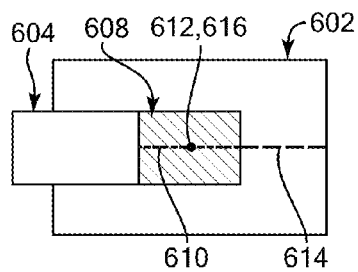
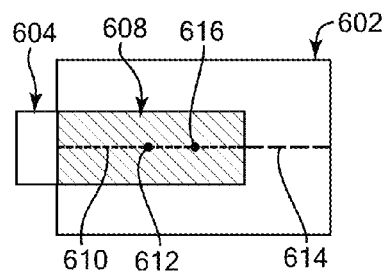
FIG. 8A      FIG. 8B
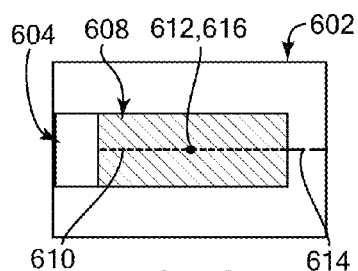
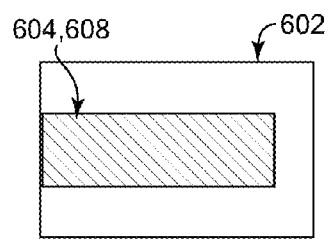
FIG. 9A      FIG. 9B

DETECTING AND MODIFYING FACIAL FEATURES OF PERSONS IN IMAGES

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images, such as photographs taken by a camera, can include characteristics unsatisfying to a user. For example, a smiling face captured in an image may show dull or yellowish teeth, which the user would prefer to be brighter and/or whiter. Other facial features may also be unsatisfactory to the user. To improve such images, a user commonly has to edit the images directly by opening an image in an editor program and manually selecting and adjusting various characteristics of pixels of the facial features, such as brightness, contrast, saturation, clarity or blurring amounts, etc.

SUMMARY

Implementations of the present application relate to detecting and modifying facial features of persons in images. In some implementations, a method includes receiving one or more general color models of color distribution for a facial feature of persons depicted in multiple training images. The method obtains an input image, and determines a feature mask associated with the facial feature for one or more faces detected in the input image. Determining the mask includes estimating one or more local color models for each of the faces in the input image based on the general color models, and iteratively refining the estimated local color models based on the general color models. The refined local color models are used in the determination of the feature mask. The method applies a modification to the facial feature of at least one of the faces in the input image using the feature mask.

Various implementations and examples of the method are described. For example, the facial feature can be teeth, one or both eyes, or other feature. The determination and storage of general color models can be performed before the input image is obtained. The general color models can be Gaussian models including a first model for the colors of feature pixels in the facial feature and a second model for the colors of non-feature pixels that are not in the facial feature in the training images. The method can include determining a probability location mask in a feature region for each of the faces detected in the input image, where the probability location mask provides a higher probability at the center of the feature region than at its edges, and the probability location mask can be used in determining the feature mask. For example, the facial feature can be teeth, and the probability location mask can be a region centered on a center of a detected mouth region, and in some cases the probability location mask is a two-dimensional Gaussian gradient distribution having a probability of 1 in the center of the probability location mask and probabilities gradually falling to zero at the edges of the region.

The estimating of local color models can include evaluating each pixel in a feature region of each of the faces with the general color models to determine a local feature color model for pixels depicting the facial feature and a local non-feature color model for pixels not depicting the facial feature. For example, a pixel color of the input image can be added to the feature color model if the probability of the pixel being a feature pixel is over a predetermined threshold, and the pixel color can be added to the non-feature color model if the probability is under the predetermined threshold. Iteratively refining the estimated local color models can include comparing and transforming the estimated local color models to the general color models. In another example, the iteratively refining can include repeating for a number of times: transforming the local color models by aligning the centers and major bases of the local color models and the corresponding general color models, and evaluating each pixel in a feature region of a face using pixel values from the transformed local color models to determine a new local color model for feature pixels and a new local color model for non-feature pixels. The iterative refining can result in resulting color models, and at least one of the resulting color models can be used to determine mask values in an individual feature mask for each of the faces. The individual feature mask determined for each of the faces can be merged into the feature mask. In one example, the facial feature is teeth, and applying a modification can include reducing a saturation value of each teeth pixel and/or increasing a brightness value of each teeth pixel.

A method includes, in some implementations, determining one or more general color models of color distribution for teeth of persons depicted in a plurality of training images. An input image is obtained, and the method determines a probability location mask in a mouth region for each face detected in the input image, where the probability location mask provides a higher probability at the center of the mouth region than at the edges of the mouth region. The method estimates one or more local color models for each face in the input image based on the general color models and the probability location mask. The method iteratively refines the estimated local color models for each face in the image by comparing and transforming the estimated local color models to the general color models. A teeth mask associated with each face detected in the input image is determined based on the refined local color models, and a color change is applied to the teeth of faces in the input image using the teeth mask. In some implementations, the transforming of the local color models can include aligning the centers and major bases of the local color models and the corresponding general color models.

In some implementations, a system can include a storage device and at least one processor accessing the storage device and operative to perform operations. The operations include receiving one or more general color models of color distribution for a facial feature of persons depicted in a plurality of training images. The system obtains an input image and determines a feature mask associated with the facial feature for one or more faces detected in the input image. Determining the mask includes estimating one or more local color models for each of the faces in the input image based on the general color models, and iteratively refining the estimated local color models based on the general color models. The refined local color models are used in the determination of the feature mask. The operations include applying a modification to the facial feature of at least one of the faces in the input image using the feature mask.

In various implementations of the system, the operations can include determining a probability location mask in a feature region for each of the faces detected in the input image, where the probability location mask provides a higher probability at the center of the feature region than at the edges, and the probability location mask is used to determine the feature mask. Estimating local color models can include evaluating each pixel in a feature region of each of the faces with the general color models to determine a local feature color model for pixels depicting the facial feature and a local non-feature color model for pixels not depicting the facial feature. Iteratively refining the estimated local color models can include comparing and transforming the estimated local color models to the general color models. In some implementations, the iteratively refining can include repeating for a number of times: transforming the local color models by aligning the centers and major bases of the local color models and the corresponding general color models, and evaluating each pixel in a feature region of a face using pixel values from the transformed local color models to determine a new local color model for feature pixels and a new local color model for non-feature pixels.

BRIEF DESCRIPTION OF THE DRAWINGS

FIGS. 6A to 9B are diagrammatic illustrations of examples in which a local color model is aligned to the corresponding general color model during a transformation of FIG. 4;

DETAILED DESCRIPTION

Figure 1:
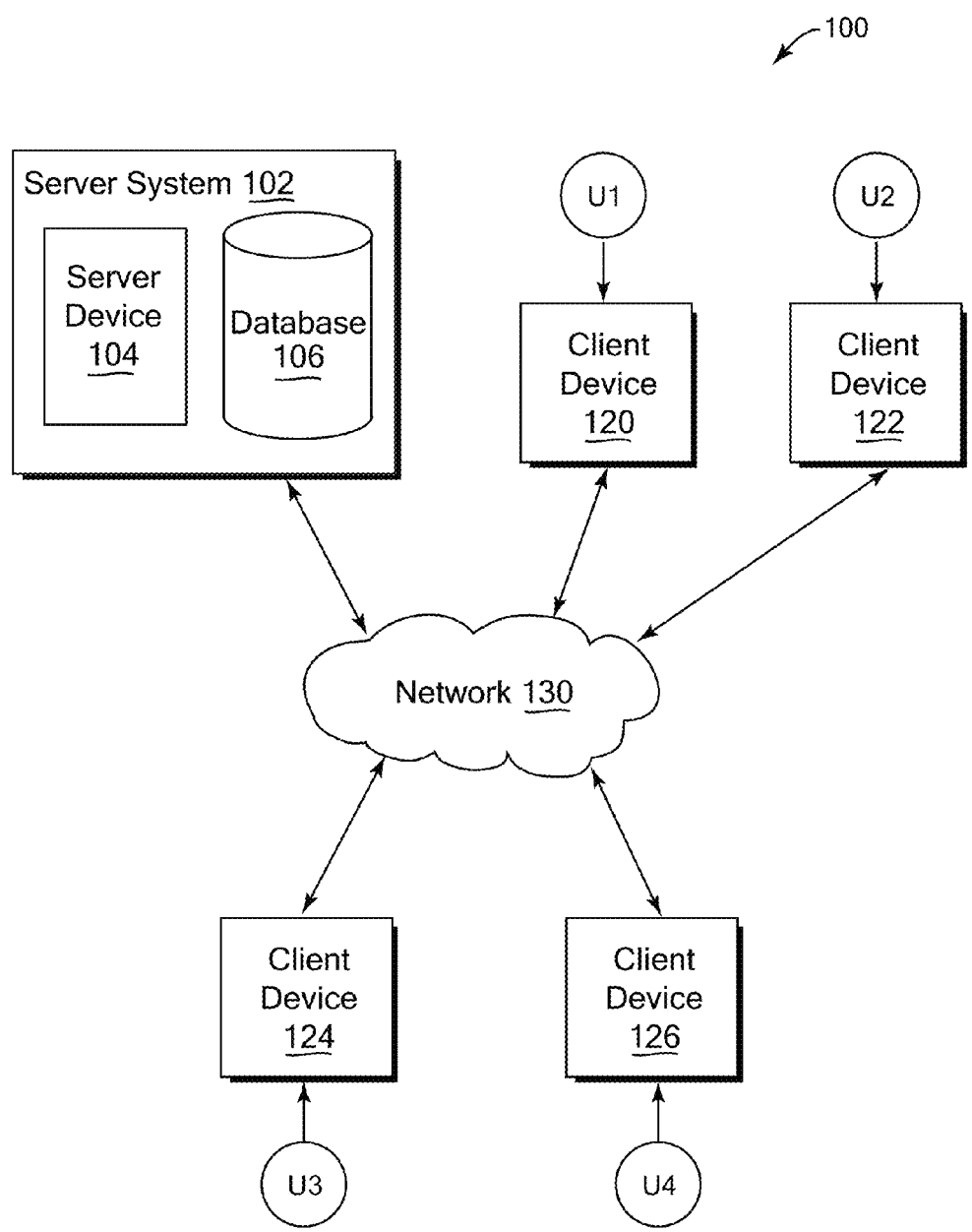
FIG. 1 is a block diagram of an example network environment which may be used for one or more implementations described herein.

One or more implementations described herein relate to detecting and modifying facial features of persons in images. For example, using pre-computed general color models for a particular facial feature, the system can build and refine local color models for that facial feature in an input image to find the image pixels that likely constitute the facial feature. The system creates an image mask from refined local color models and modifies the image facial feature using the mask, such as whitening a teeth feature.

Various implementations allow a system to automatically identify the pixels of particular types of facial features in an image with high accuracy and modify just those features in the image. This can allow a user to easily adjust facial features images, thus promoting easier, quicker, and higher-quality image editing operations, and can result in more consistent and pleasing facial modifications in images. In addition, a user need not know how to perform image editing operations with a manual editor, since facial features can be automatically found and modified. Thus, a technical effect of facial feature detection and modification as disclosed herein include a reduction in duration of editing images, thus saving a user time, energy, and resources for achieving edits to images. Another technical effect is a higher quality of edits to images resulting from more appropriate edits being applied to images, and more consistent application of similar edits across various images.

In example implementations, the system can pre-compute (or receive) general color models of color distribution for facial feature pixels based on a large number of training images which have had feature regions (e.g., elliptical areas) determined and which surround the facial feature. These images have had feature pixels and non-feature pixels designated in the feature region, e.g., by manual manipulation from users. For example, the system can create two general color models that are 3-D Gaussian distribution models: a model for the feature pixel colors and a model for the non-feature pixel colors in the feature region. In some examples herein, the sought facial feature is teeth and the feature region is a mouth region. Other facial features can also be processed by methods described herein.

If the system receives a new input image, faces in the image can be detected by known techniques, e.g., a mouth designated with facial landmark points. To reduce misidentified pixels (e.g., skin pixels that may have similar color to teeth), the system can create a probability location mask for the feature region that increases the probability of certain locations in the feature region, such as a higher probability at the center of the feature region (e.g., where teeth are most likely located) and gradually decreasing probability to zero at the edges of the mouth area.

The system also estimates a local color model for feature pixels and a local color model for non-feature pixels in the feature region, using as a reference the general color models and also using the probability location mask. For example, pixel values of each pixel in the feature region are examined using the general color models to find the probability of the pixel having its current color if it is a feature pixel, and another probability if it is non-feature pixel. The feature pixel probability can be multiplied by the corresponding value in the probability location mask. The probability values are then used to help estimate local color models. For example, the probability values can be input to Bayes' theorem (for conditional probabilities), and the result can be compared to a predetermined threshold. If the result is over the threshold then the pixel's color values are added to a new feature local color model, and are otherwise added to a new non-feature local color model.

The initial local models are based on general models that may be too general such that the local models may not indicate all the feature pixels for a particular person's image (due to differences such as lighting in the image, etc.). To more accurately identify all feature pixels in a particular image, the system can iterate the color model estimation one or more times to refine the local color models. For example, the local color models can be compared to the corresponding general color models and transformed such that the center and major bases of the local color models and general color models are aligned. The system then processes probability values similarly as described above using pixel values of the transformed local model examined with the general model, which provides a new local color model. In another iteration the new model is again transformed using the general color model, and so on. This results in more refined local color models that more accurately identify which pixels are facial feature pixels.

The system can use the refined feature local color model values to fill in corresponding values in an individual feature mask. For example, a feature mask value can have a nonzero value if the corresponding pixel has a probability of being a feature pixel that is higher than the threshold, where the higher the probability, the higher the mask value. Such a feature mask can be similarly created for all faces in the image, and these individual feature masks can be merged into a single overall feature mask. The overall feature mask can be used to modify the features of the faces in the image. For example, teeth features can be whitened by reducing the saturation of each teeth pixel, increasing the brightness of each teeth pixel, and/or merging a whitened teeth image layer with the original image to create a natural effect.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content including text, images, video sequences, audio sequences or recordings, or other types of content for access by designated sets of users of the social network service, and/or perform other socially-related functions.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
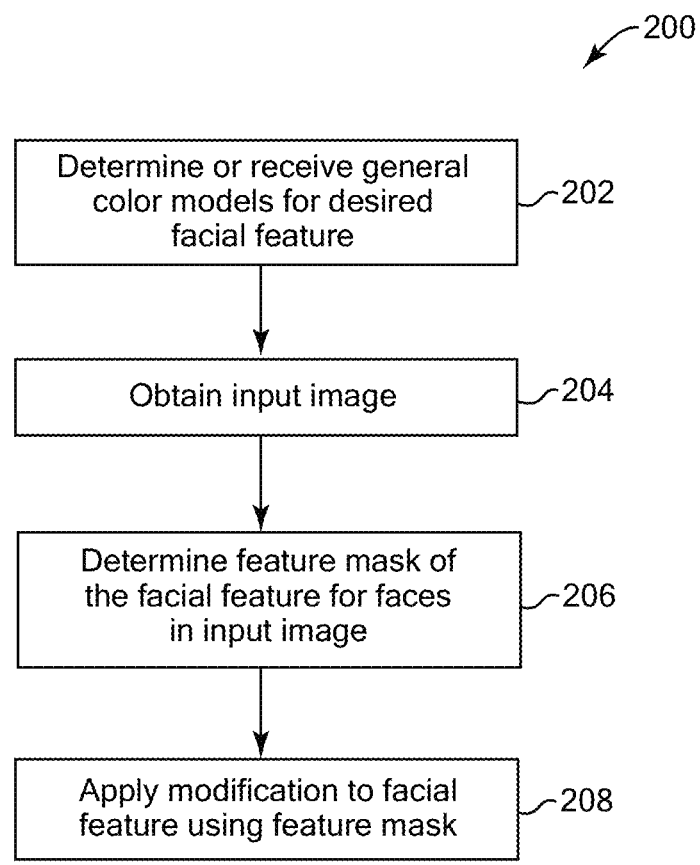
FIG. 2 is a flow diagram illustrating an example method for modifying facial features of persons in images, according to some implementations.

FIG. 2 is a flow diagram illustrating one example of a method 200 for modifying facial features of persons in images. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be periodically performed, or performed based on one or more particular events or conditions such as a user opening an application such as an editing application, receiving one or more images that have been newly uploaded to or accessible by the system, etc. In some implementations, such conditions can be specified by a user in custom preferences of the user. In some implementations, the method 200 or portions thereof can be performed with guidance by the user. For example, a user can designate a set of multiple input images to be input and processed by method 200. In one non-limiting example, method 200 (or portions thereof) can be performed on a camera, cell phone, or other client device that has captured one or more images. In addition or alternatively, a client device can send images to a server over a network, and the server can process the images using method 200, or the server can receive images from a different source (a different server, etc.).

In the various implementations described herein, reference is made to "facial features." Facial features can be any features on a face, such as teeth, lips, nose, eyes, or facial skin. Generally, a type of facial feature can be detected and modified, such that any individual instance of that type can be found and modified by methods herein. Many of the examples below refer to teeth as the type of facial feature being masked for explanatory purposes, but other types of facial features can be similarly processed in other implementations. For example, where a mouth region is described in some examples, other examples can use analogous regions, such as a region around a nose, a region around an eye, etc.

In block 202 of method 200, the method determines or receives general color models for a particular facial feature that is desired to be detected in new images. The general color models are built from multiple training images showing the particular facial feature. In some implementations, method 200 can perform block 202 to create the general color models, while in other implementations the method 202 receives the general color models which were previously determined by one or more other systems. In some implementations, block 202 can be processed at any time before the later blocks of method 200 are performed. For example, block 202 can be performed by a different system and/or at a much earlier time then the remainder of method 200 which can be performed by different system and/or at a later time. Some examples of determining the general color models in block 202 are described below with reference to FIG. 3.

In block 204, the method obtains an input image for processing. The image can be a digital image composed of multiple pixels, for example, and can be stored on one or more storage devices of the system or otherwise accessible to the system, such as a connected storage device, e.g., a local storage device or storage device connected over a network. For example, the image can be a photo captured by a camera, an image frame extracted from a captured video stream or other video data, or an image derived from a different source. In some implementations, a user can provide or designate one or more input images to process. In other implementations, the image can be automatically selected by the method, e.g., as an image from an album or other collection of multiple images, such as an album provided in an account of a user of a social networking system. In some examples, the system can determine which image to obtain based on evaluating one or more characteristics of accessible images, such as the color distributions of images, timestamps and other metadata of images, and/or identified and recognized content depicted in the images, such as persons, faces, or objects.

In block 206, the method determines a feature mask for the particular or desired facial feature of one or more faces in the input image by detecting facial feature pixels in the input image. In some implementations, the method can include all faces in the image in the processing of the mask, while in other implementations only a subset of faces in the image are processed based on user preferences or other criteria. In some examples, the feature mask covers the entire input image and includes pixels having values within a predetermined range, where one end of the value range indicates that a modification is allowed to pass through to the associated pixel in the input image, and the other end of the value range prevents the modification to the associated pixel. For example, in some visual representations of the mask, black pixels can prevent modification, white pixels can allow full modification, and grey pixels represent in-between values allowing partial modification to the corresponding pixels proportional to the values.

The feature mask is determined by creating local color models which are tailored to the input image, where the local color models are based on the general color models determined in block 202 as references. The general color models are trained using a variety of feature pixels in many images and ideally cover all the cases of colors of the facial feature in one model, and ideally cover all non-feature pixel colors in another model. The general color models are robust but can be too generalized for a particular image, leading to missing some feature pixels in that image. Thus local color models are created and refined to include more pixels of the desired feature in the particular colors of the image, yet are still robust enough to cause selection of all the feature pixels of the face for the determination of the feature mask. Some examples of determining a feature mask are described below with reference to FIG. 4.

In block 208, the method applies one or more modifications to the facial feature in the input image using the feature mask determined in block 206. The feature mask causes the changes to be applied only to the facial feature. For example, the pixels of the facial feature can be changed in characteristics such as color value, saturation, brightness, hue, luminance, or other pixel characteristics.

In an example where the modification of the facial feature is the whitening of teeth, one or more of the following modifications can be made. In one modification, each teeth pixel in the mask can be whitened by reducing the saturation of the pixel in the HSV (Hue, Saturation, Value) color space. The larger the value in the mask (e.g., the more confident that it is a teeth pixel), the more that the saturation is reduced, e.g., more whitening is added. In another modification, each teeth pixel can be brightened by increasing the "value" parameter of the pixel in the HSV color space. In another modification, the opacity of a whitened teeth image layer can be set to provide a more natural look when that layer is merged or blended with the input image, where the higher the whitening strength, the higher is the percentage of the whitened layer seen in the resulting image. For example, an opacity can range from a value of 0 that causes only the original image to be displayed, up to a value 1 that causes only the whitened layer to be displayed, and the opacity can be set to a value between these extremes. These and other modifications can be made to teeth features in other implementations.

In other examples, other facial features can be modified. For example, eyes of a person can be brightened or changed to a different color. A facial skin feature can be modified by blurring the skin. Any facial feature can be modified by performing or editing contrast enhancement or adjustment, noise reduction, darkening, overall brightening, brightening shadows, highlight recovery, saturation increase or decrease, opacity blending (as described above), etc.

Thus, the method allows automatic editing of a particular facial feature in input images, without a user having to manually edit those images. Therefore, less effort and resources are needed for a user to effectively edit an image.

In some implementations, the method 200 can be performed additional times for additional types of facial features, if it is desired to process other types of facial features. For example, teeth may be processed a first time that method 200 is performed, and eyes can be processed a second time. General color models that are specific for the additional types of facial features can be used in such cases.

Figure 3:
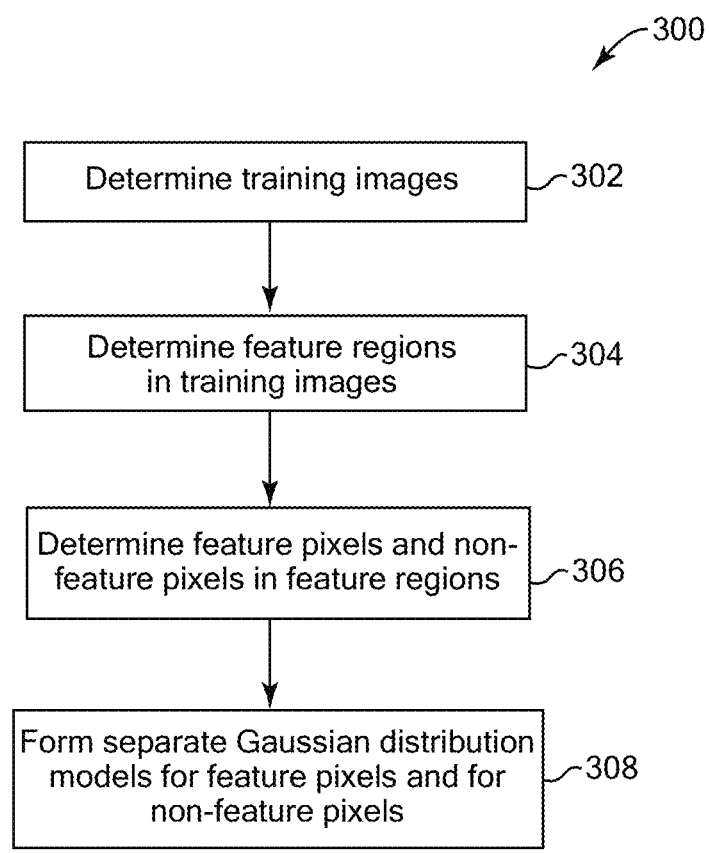
FIG. 3 is a flow diagram illustrating an example method for implementing a block of FIG. 2 in which the method determines general color models for a particular facial feature.

FIG. 3 is a flow diagram illustrating an example method 300 implementing block 202 of FIG. 2, in which the method determines general color models for a particular facial feature, according to some implementations. Method 300 can be implemented by a system such as a server and/or client device as described above for method 200. Method 300 can be implemented by the same or different system than the system processing an input image in method 200.

In block 302, the method determines multiple training images that depict faces. For example, a large number of training images can be obtained from Internet sites, such as social networking services, photo viewing services, web sites, and other available sources.

In block 304, the method determines the feature regions in each of the training images. A feature region is an area of the face that includes the particular or desired facial feature that is to be trained for. In one example in which the facial feature is teeth, the feature region can be a teeth region that surrounds the mouth in each face of the training images. For example, the feature region can be an ellipse (or other shape) surrounding the teeth and lips of each face, where the ellipse is determined based on landmark points provided by a facial recognition technique. In one example, the landmark points can be at the extremes of the detected mouth, and/or can have a center point in the middle of these extreme landmark points. The ellipse can then be determined as having a center at the center landmark point, and having axes at the maximum distance between the center and the left/right points, and at the maximum distance between the center and upper/lower points.

In block 306, the method determines feature pixels and non-feature pixels in the region. For example, these pixels can be designated on the system running method 300, or method 300 can receive indications of feature and non-feature pixels determined separately from the method. In some examples, determining these pixels is based on manual actions. For example, persons can manually view each face in each image having the feature region marked, such as the ellipse type of region described above. In an example where the facial feature is teeth, a person can select which pixels are teeth pixels in the ellipse region, and the other pixels in the ellipse region are then designated as non-teeth pixels. This selection can be performed for all of the training images.

In block 308, the method forms separate Gaussian distribution color models for the pixels, where one color model is for the feature pixels and one color model is for the non-feature pixels. In one non-limiting example using teeth as a facial feature, the color values of the teeth pixels and the non-teeth pixels can be provided in the LAB (Lightness and AB color dimensions) color space having three color components, so that three-dimensional Gaussian distribution models are created, one dimension for each component. Other color spaces can be used in other implementations, such as YCbCr, RGB, HSV, HSL, HSI, etc. The formed color models are general color models that are the reference for finding similar colors in new images. These two general color models can be pre-computed and stored so that the general color models can be used repeatedly for finding facial features in new input images.

Figure 4:
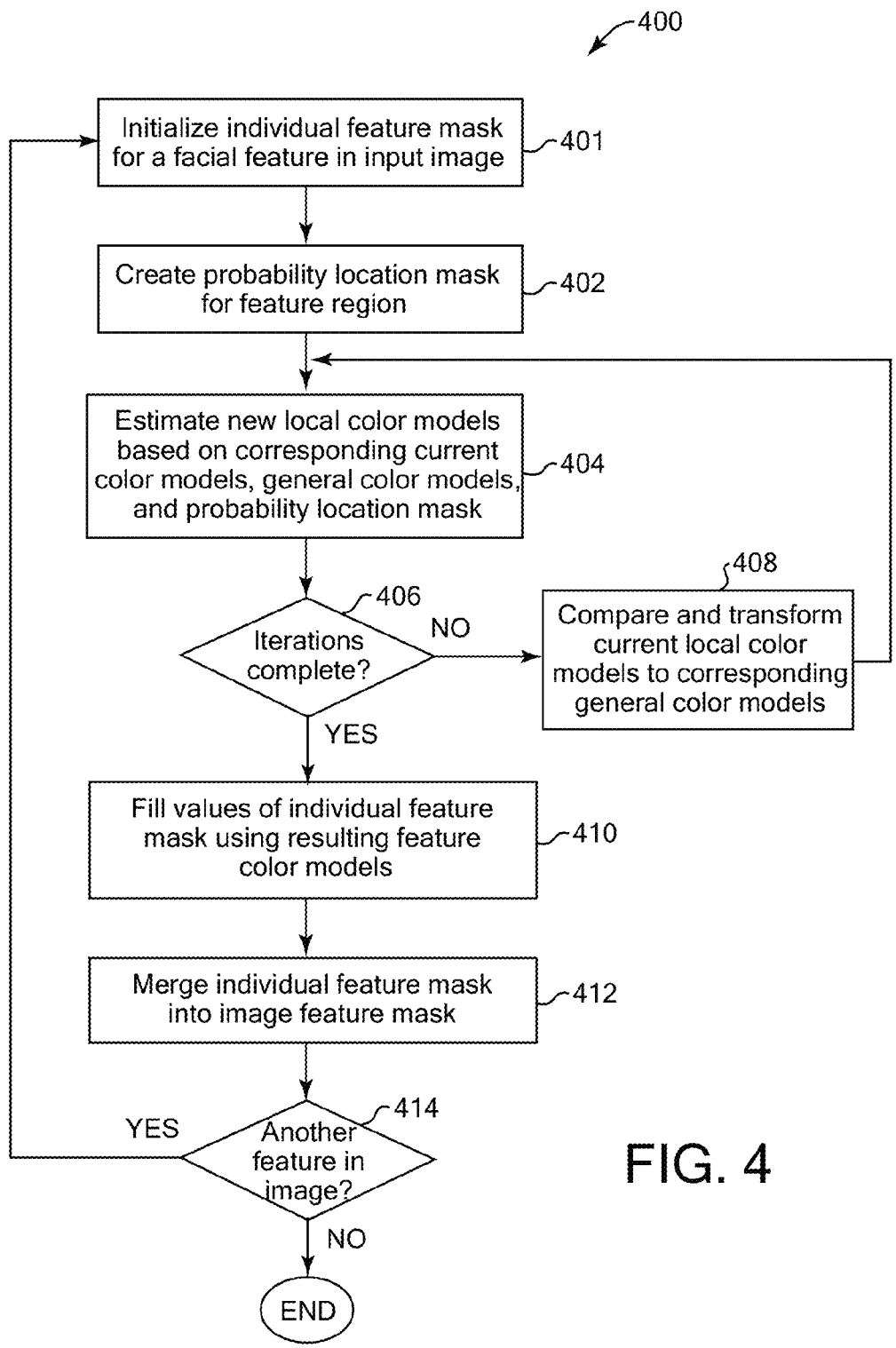
FIG. 4 is a flow diagram illustrating an example method implementing a block of FIG. 2 in which the method determines a feature mask for the facial feature for faces in the image.

FIG. 4 is a flow diagram illustrating an example method 400 implementing block 206 of FIG. 2, in which the method determines a feature mask for the facial feature for faces in the image, according to some implementations.

In block 401, the method initializes an individual feature mask for a facial feature in the input image. The individual feature mask is a mask that covers only a particular facial feature in the input image. For some types of facial features such as teeth, there is one facial feature in each face depicted in the input image, and so there will be one individual mask per face. In other cases, there can be multiple of a certain type of facial feature in each face, such as eyes, and so there can be multiple individual masks per face. The individual feature mask can be initialized with initial values at the pixel positions, such as zeroes or other values indicating zero probability.

In block 402, the method creates a probability location mask in a feature region of the input image. The feature region can be a region in the input image that is determined similarly to the regions used in the training images for determining the general color models as described above with reference to FIG. 3. For example, in the case of a teeth feature, the feature region can be an area centered on axes based on landmark locations of the mouth of the face in the image, where the landmark locations are provided by one or more facial recognition techniques. For example, there can be five landmark locations found by the facial detector, which are the left, right, top, bottom extreme points and the center of the detected mouth. In some implementations, all of the faces in the input image can be processed to find the associated feature regions in those faces. The feature region can be of any shape, e.g., elliptical, rectangular, etc. The search for the facial feature is to be limited to the feature region, allowing faster processing of the overall method and excluding some possible false positives (e.g., skin color pixels that can be falsely identified as teeth pixels).

In some implementations, the color values of the pixels within the feature region can be converted to a different color space. For example, pixels that are in the RGB color space can be converted to LAB color space, or other color spaces in other implementations.

The probability location mask is a mask for modifying the probability of pixels in the feature region based on the spatial location of those pixels within the feature region. In one non-limiting example, the method can create the mask by determining a two-dimensional Gaussian gradient distribution that is fitted to the feature region (such as a mouth ellipse). This distribution serves as the probability mask. For example, the distribution can be 1 in the center of the probability location mask and can gradually fall to 0 at the edges of the location mask. For a teeth facial feature, this mask distribution models the case that teeth pixels are more likely to be positioned at or near the center of the mouth than at the edges of the mouth, and so the mask should reduce the probability at the edges of the mouth. This can help to reduce false positives in cases where skin or lip pixels have a similar color to teeth pixels.

In block 404, the method estimates new local color models for the input image based on corresponding current color models, general color models, and the probability location mask determined in block 402. For the first time performing block 404 for the selected facial feature, the new local color models are the initialization of the local color models and no current color models are used (only the general color models). In later iterations of block 404, each new set of local color models is used as the current local color models for that iteration. Each new local color model corresponds to a current color model. For example, if there is a general color model for feature pixels and a general color model for non-feature pixels, then a local color model for feature pixels and a local color model for non-feature pixels are estimated. As described below, these local color models are more tailored to the specific input image, and therefore feature pixels can be detected more accurately than when using only the corresponding general color models that are based on a wide variety of training images. Both color and location can be used to determine which pixels belong to the desired feature and which pixels do not. Some examples of estimating the new local color models are described below with reference to FIG. 5.

In block 406, the method checks whether iterations to refine the local color models are complete. Method 400 iterates particular blocks of method 400 multiple times, including block 404, to refine the new local color models determined in block 404 and using the general color models as references. In some implementations, the number of iterations can be a predefined number. In other implementations, the method can dynamically determine the number of iterations based on examining the newest local color models obtained from block 404. For example, the method can examine the changes in newly-updated local color models compared to the local color models of the previous iteration. If the changes are below a predetermined threshold, then no significant changes have been made to the models by the last update, and continuing to update the model will no longer be of much help in refining the local color models. The method can therefore stop the iterations at that point.

If the iterations are complete as checked in block 406, the method continues to block 410, described below. If the iterations are not complete in block 406, the method continues to block 408. The new local color models just previously determined in block 404 are designated to be current color models. In block 408, the method compares and transforms the current local color models to the corresponding general color models. This is performed to refine the current local color models so that they will include a greater number of feature pixels than they did before the transformation. For example, if the current color models are the initial local color models directly based on the general color models, they are coarse and include only part of all the feature pixels. Further refinement through the iterations causes the local color models to include more feature pixels of the input image.

The current local color models may include only a portion of the color distribution that includes all the feature pixels. In some example implementations, this portion in the initial estimation is used as a seed to grow new local color models in each iteration, where each iteration is an update of the local color model. Thus in block 408, the method compares each current local color model (one model for the feature pixels and the other model for the non-feature pixels) with the corresponding general color model, and transforms or reshapes the local color models based on the comparisons to achieve more accurate results. In some implementations, the method performs the transformation by aligning the means (e.g., centers) and the major bases of a general model and corresponding current local color model. A major basis is the first principal component of the data matrix formed by all the data points in the model, and this component has the largest possible variance (e.g., it accounts for the most variability in the data), as known in principal component analysis. Some examples of the transformation are described below with reference to FIGS. 6A to 9B.

In an example of transforming a local color model to a general model, the method determines a transformation matrix such that by multiplying the transformation matrix with a point of the local color model, the point in the local color model is transformed into a corresponding point in the general model. For example, the transformation can follow transformation examples in FIGS. 6A to 9B on a point-to-point basis. For example, if P1 is a point in image color model 604 in FIG. 6A, P2 is its corresponding transformed point in general color model 602 and T is transformation matrix. An example formula to transform P1 to P2 is $$P2=(P1-\text{local mean})*T+\text{general mean}$$

where the local mean is the mean of the local color model and the general mean is the mean of the general color model. For example, referring to FIGS. 6A-9B, mean 612 can be transformed to mean 616 by the formula.

The process then returns to block 404 to estimate a new local color model using the transformed current local color model. For example, block 404 evaluates the probability of the transformed point P2 in the general color model and obtains P(color|feature), and then determines P(feature|color) as described below for FIG. 5. The new local color model includes more of the feature pixels of the input image. The process then returns to block 406 to again check whether the iterations are complete. As described above, in some implementations, the method can perform a predetermined number of iterations, and another iteration is performed if one or more of those predetermined iterations remain. In some implementations, the iterations are continued until changes in the local color model between iterations are below a predetermined threshold, as described above. If another iteration is performed, the method continues to block 408 to again compare and transform the local color models.

After the iterations are complete, the new local color model is the final resulting local color model that can identify feature pixels in the input image, and the method continues to block 410. In this block, the method fills the values of an individual feature mask using the resulting color model for the feature pixels (e.g., not using the resulting model for the non-feature pixels). In one non-limiting example, each pixel of the feature mask can be assigned a value between 0 and 255. The higher the value, the higher the probability that the pixel at that mask position is a feature pixel. For example, the feature mask can be represented as a grayscale image based on these mask values. The feature mask can be filled at each pixel location with the corresponding probability of that pixel being a feature pixel as determined using the probability relationships described below in FIG. 5, for example.

In block 412, the method merges the individual feature mask determined in block 410 with an overall image feature mask that covers the entire input image. If this individual feature mask was the first to be processed, then the overall feature mask currently includes only that individual mask, and additional individual masks can be determined and merged similarly as described above if there are additional faces in the input image.

In block 414, the method checks whether there is another of the same type of facial feature in the image to process. For example, there may be other faces in the input image which can be processed as described above to provide an individual feature mask. If there is another feature, the method returns to block 402 to create another probability location mask for the next feature and to create an individual feature mask for that feature. If there are no more facial features in the image to process at block 414, the method ends.

Figure 5:
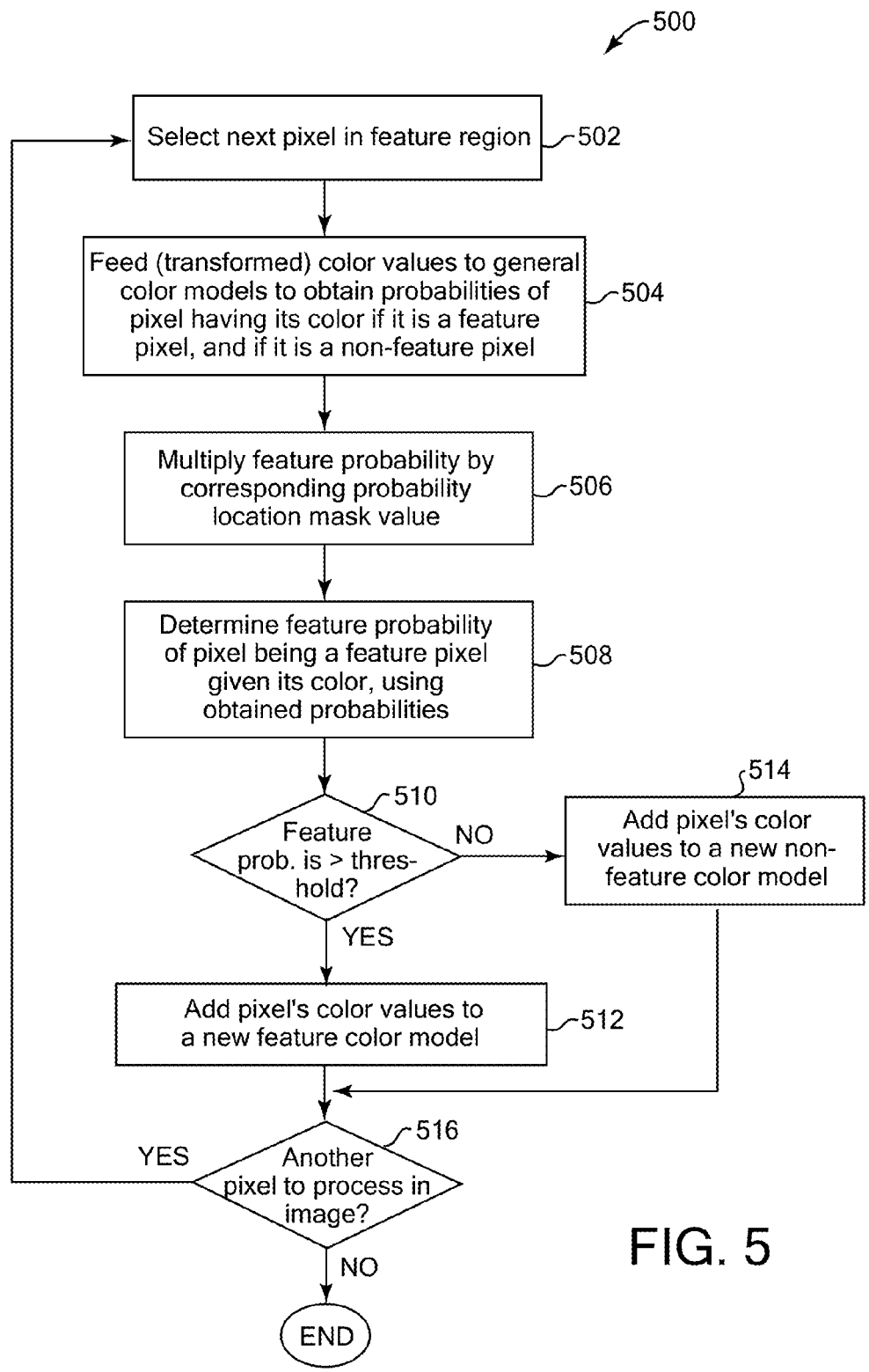
FIG. 5 is a diagram illustrating example method implementing a block of FIG. 4 in which the method estimates new local color models based on current color models and the probability location mask.

FIG. 5 is a flow diagram illustrating an example method 500 implementing block 404 of FIG. 4, in which the method estimates new local color models based on current color models, general color models, and the probability location mask, according to some implementations.

In block 502, the method selects the next pixel in the feature region. For example, this can be a pixel in the determined mouth region if the desired facial feature is teeth. In block 504, the method feeds color values of the selected pixel to the corresponding general color models to obtain probabilities. The color values fed to the general color models are the original pixel color values if this is the first time that method 500 is performed for a particular individual feature mask. In later iterations of method 500 (as described in FIG. 4), the color values fed to the general color models are transformed color values obtained from the newest transformed local color models determined in block 408 of FIG. 4.

The obtained probabilities include one obtained probability that is provided from the feature color model, which is the probability of the selected pixel having its current color if it is known that the pixel is a feature pixel (e.g., P(color|feature)). The other obtained probability is provided from the non-feature color model, and is the probability of the selected pixel having its current color if it is known that the pixel is not a feature pixel (e.g., P(color|not feature)). As described previously, the colors can be processed in a LAB color space or other suitable color space.

In block 506, the method multiplies the probability for the pixel being a feature pixel (e.g., P(color|feature)) by the probability value at the corresponding pixel location of the probability location mask (determined in block 402). Thus, the probability obtained by this multiplication is based on values from the current local color model and is based on the position of the pixel within the feature region in the input image.

In block 508, the method determines a "feature probability," which is the probability of the selected pixel being a feature pixel given its known color, e.g., P(feature|color). This feature probability is determined using the probabilities obtained for feature pixels in block 506 and for non-feature pixels in block 504. In one non-limiting example, the method can use a relation such as Bayes' Theorem, an example of which is shown below in a case where the facial feature is teeth and the color space used for the pixel color is the LAB color space.

$$P(\text{teeth} | LAB) = \frac{P(\text{teeth})P(LAB | \text{teeth})}{P(LAB)}$$

$$P(\text{teeth} | LAB) = \frac{P(\text{teeth})P(LAB | \text{teeth})}{P(\text{teeth})P(LAB | \text{teeth}) + P(\text{not teeth})P(LAB | \text{not teeth})}$$

$$P(\text{teeth} | LAB) = \frac{1}{1 + P(\text{not teeth})P(LAB | \text{not teeth}) / P(\text{teeth})P(LAB | \text{teeth})}$$

where P(LAB|teeth) is the probability of the pixel having its color if it is known to be a feature pixel (e.g., teeth pixel), as obtained in block 506 from the use of the current color model, general color model, and the probability location mask. P(LAB|not teeth) is the probability of the pixel having its color if it is known to be a non-feature pixel (e.g., not teeth pixel), as obtained in block 504. P(teeth) is the probability of a pixel being a teeth pixel without knowing its color or anything about it, which is a 50% chance (e.g., the pixel is either teeth or not teeth). P(not teeth) is equal to (1−P(teeth)). P(teeth|LAB) is the feature probability of the selected pixel being a feature pixel given its color. Other probability relations can be used in other example implementations.

In block 510, the method checks whether the feature probability is greater than a predetermined threshold. In some implementations, this threshold can be a constant threshold regardless of the iteration of blocks 404 to 408. In other implementations, this threshold can vary and can be based on the current iteration. For example, the threshold can start as a lower value, and can be increased for each iteration, thus reflecting a more accurate color model at a generation. In one non-limiting example, the threshold can start at 0.3 and can end at 0.5 in the last iteration(s).

If the feature probability is greater than the threshold, in block 512 the method adds the selected pixel's color values to a new local color model for feature pixels. Thus the new color model reflects more accurate feature colors for the input image than the current color model, due to the threshold requirement. The method then continues to block 516, described below. If the feature probability is less than the threshold in block 510, then the method continues to block 514, where the color values of the selected pixel are added to a new local color model for non-feature pixels. This indicates that the selected pixel is more likely to not be part of the facial feature.

In block 516, the method checks whether there is another pixel to process in the feature region of the input image. If so, the method returns to block 502 to select another pixel and process it in method 500. If there are no other pixels to process, then the method ends. After all the pixels in the feature region are processed in method 500, the new local color models are provided as the estimated color models provided by block 404 of FIG. 4 and (when iterations are complete) used to identify the feature pixels (e.g., detect the facial feature) in the input image for creation of the feature mask.

Various blocks and operations of methods 200-500 can be performed in a different order than shown and/or at least partially simultaneously, where appropriate. For example, some implementations can perform blocks of the methods at various times and/or based on events not related to a user editing an image. In some implementations, blocks or operations of methods 200-500 can occur multiple times, in a different order, and/or at different times in the methods. In some implementations, the methods 200, 300, 400, and/or 500 can be implemented, for example, on a server system 102 as shown in FIG. 1. In some implementations, one or more client devices can perform one or more blocks instead of or in addition to a server system performing those blocks.

FIGS. 6A through 9B are diagrammatic illustrations of examples in which a local color model is aligned to the corresponding general color model during the transformation described above in block 408. In these examples, four iterations are performed (e.g., three updates to the initial local color model). In this example, the facial feature is teeth.

FIGS. 6A and 6B illustrate the relationship between a general color model for teeth and an initial local color model determined for teeth based on the general model. In FIG. 6A, the rectangle or region 602 represents the general color model for teeth as determined in block 202, and the rectangle or region 604 represents the entire ideal color model for this particular input image in which all the colors are known for the teeth shown in the input image, and which is mostly unknown at this stage. In FIG. 6B, an overlapping region 608 is shown which includes the overlapped area between the regions 602 and 604. This represents the portion of the image color model 604 that is known by the initial local color model after initialization (first iteration), and is a rough estimation to be used as a starting point to grow. FIG. 6B also graphically shows a major axis 610 of the initial local color model (intersected region 608) and the mean 612 of the initial color model. In addition, FIG. 6B shows a major axis 614 and a mean 616 of the general model region 602.

FIGS. 7A and 7B illustrate an example in which the local and general color models have been compared and, based on the comparison, the method has performed a transformation of the local color model to the general color model. Here, the method compares the means and major axes of the corresponding general and local color models and the transformation includes aligning the means and the major axes of those models. FIG. 7A shows the result of aligning the major axis 610 of region 608 with the major axis 614 of general region 602 and aligning the mean 612 of region 608 with the mean 616 of general region 602. The regions 604/608 have been pivoted from the position in which the major axis 610 was vertical to the current position in which major axis 610 is horizontal and aligned with the major axis 614 of region 602. In addition, the regions 604/608 have been centered along the major axis 614 to align the mean 612 with the mean 616.

FIG. 7B shows the same model relationship as in FIG. 7A, except that the overlapping region 608 now has been updated based on the transformation. Region 608 is enlarged to cover a greater overlapping area between the two model regions 602 and 604. In addition, the major axis 610 of the overlapping region 608 now extends in the vertical directions due to the overlapping region now having greater height than width, and the mean 612 of the overlapping region 608 has moved away from the mean 616 of general region 602. This greater overlapping area indicates that additional teeth pixels from the image teeth color model 604 have been discovered in the latest local color model 608. However, much of the image model region 604 remains outside the general color model region 602, and another iteration can be performed.

FIGS. 8A and 8B show the result of another comparison and transformation of the local color model region 608 (including the image color model region 604) to the general color model region 602. The overlapping region 608 and image region 604 have been pivoted back to a horizontal position to align the major axis 610 of region 608 with the major axis 614 of general region 602. In addition, the mean 612 of the region 608 is aligned with the mean 616 of general region 602, causing the image region 604 to be moved further within the general region 602. As shown in FIG. 8B, the overlapping region 608 now extends further to the left direction in the image, causing the mean 612 to be moved to the left of mean 616 of general region 602. A portion of the image region 604 remains outside the general region 602, and another iteration can be performed.

FIGS. 9A and 9B show the result of another comparison and transformation of the local color model region 608 (and image color model region 604) to the general color model region 602. As shown in FIG. 9A, the overlapping region 608 and image region 604 have been moved to the right to align the mean 612 with the mean 616. As shown in FIG. 9B, this causes all of the image model region 604 to overlap the general model region 602, indicating that all of the teeth pixel colors in the input image have been discovered in the new local color model and that the entire image color model region has been discovered. This final local color model is provided as the resulting local color model for teeth pixels. A similar process is performed for the initial local color model of the non-teeth pixels in the input image, providing a resulting local color model for non-teeth pixels.

FIGS. 10A-10C and 11A-11C are diagrams illustrating example images processed according to some features described herein. In some implementations or applications, the images can be received from a variety of sources, such as memory, storage drives, or other storage of one or more users, and can be stored in a variety of formats, such as an image in the user's photo albums, an image frame in a movie or other video sequence, etc. The images can be processed as described herein by a client or server device. In some implementations, the images can be displayed on a display device, e.g., of a client device 120, 122, 124, and/or 126 of FIG. 1, or a server system 102 in some implementations. In one non-limiting example, the user can view the image displayed by a display device in a graphical interface provided by a client device or server device.

Figure 10A:
FIGS. 10A-11C are diagrams illustrating example images being processed according to some features described herein.

FIG. 10A shows an example of a training image 1000 which can be determined and processed by block 302 of FIG. 3, in some implementations. For example, the training image 1000 can be obtained from sources such as web pages, sites on the Internet, or other database of images. The training image 1000 can be processed to detect that a face is depicted, and so may be suitable as a training image for the face-oriented methods described herein. For example, face recognition techniques can be used to detect a face in image 1000.

Figure 10B:

FIG. 10B shows the image 1000 after a feature region has been determined in the image. In this example, the particular facial feature is teeth, and so a feature region of interest on the face is the mouth region. In some implementations, an ellipse such as ellipse 1002 can be created to designate a feature region, such as a mouth region including and surrounding the teeth. In some examples, the ellipse 1002 can be created from mouth landmark points that are provided from a face detection technique. For example, the ellipse 1002 can be centered on a center landmark points of the mouth.

Figure 10C:
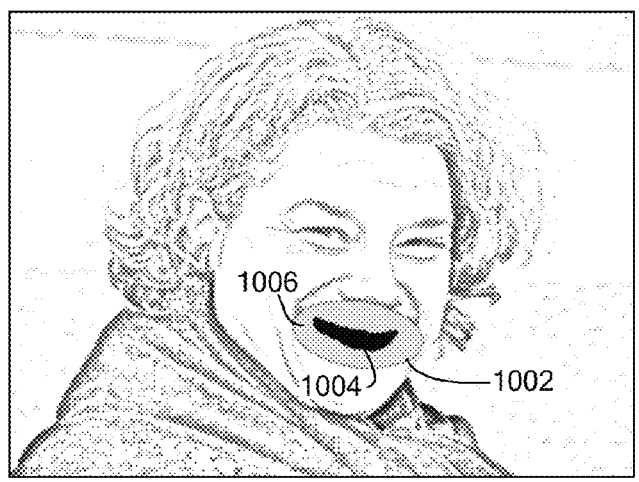

FIG. 10C shows the image 1000 after feature pixels and non-feature pixels have been determined in the mouth region 1002. In this example, feature pixels are teeth pixels 1004, and the non-feature pixels are non-teeth pixels 1006 included within the mouth region 1002 surrounding the teeth pixels. In some implementations, the feature pixels and non-feature pixels can be designated manually, e.g. by a user viewing and editing the image 1000.

Figure 11A:

FIG. 11A shows an example input image 1100 which can be processed by features described herein to modify one or more facial features. In this example, the facial feature is teeth and is desired to be modified by whitening the teeth of the depicted person.

Figure 11B:
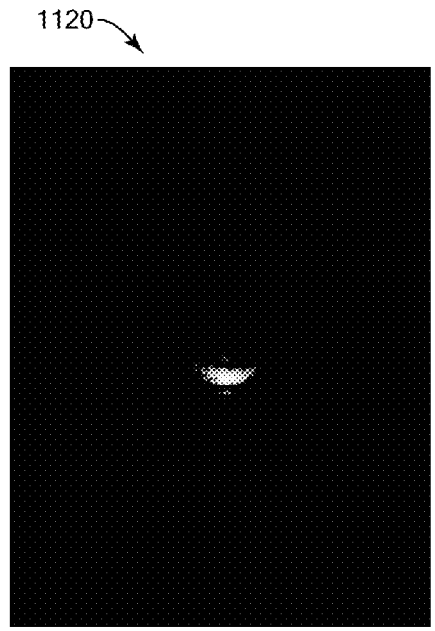

FIG. 11B shows an example feature (teeth) mask 1120 which is the result of processing the image 1100 of FIG. 11A based on methods described herein. In this example, black pixels represent a zero value of the mask, white pixels represent the highest value (e.g., 255) in the mask, and gray pixels represent values between zero and 255 in the mask.

Figure 11C:
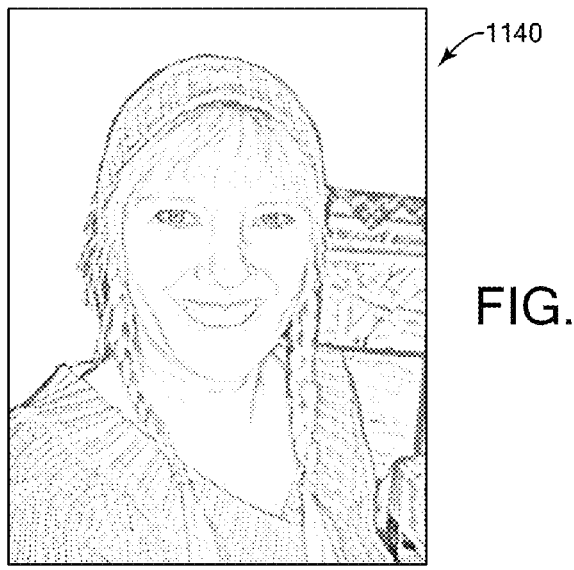

FIG. 11C shows a resulting input image 1140 which has been modified using the feature mask 1120 of FIG. 11B. Using the mask, only the teeth of the subject in the image have been modified to be whitened. In this example, the teeth have been brightened by reducing the saturation of the pixel in the HSV color space and brightening each teeth pixel by increasing the "value" in the HSV color space, for example.

Figure 12:
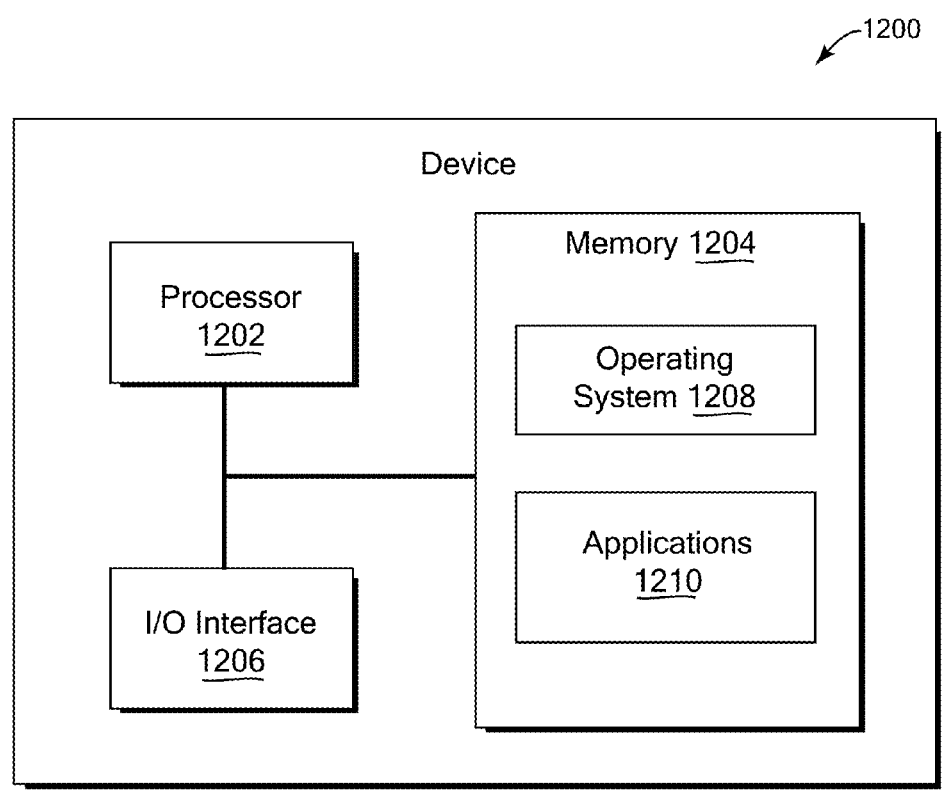
FIG. 12 is a block diagram of an example device which may be used for one or more implementations described herein.

FIG. 12 is a block diagram of an example device 1200 which may be used to implement one or more features described herein. In one example, device 1200 may be used to implement server device 104 of FIG. 1, and perform appropriate method implementations described herein. Device 1200 can be any suitable computer system, server, or other electronic or hardware device. For example, the device 1200 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 1200 includes a processor 1202, a memory 1204, and input/output (I/O) interface 1206.

Processor 1202 can be one or more processors or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the device 1200 by the processor 1202, including an operating system 1208 and one or more applications engines 1210 such as a graphics editing engine, web hosting engine, social networking engine, etc. In some implementations, the applications engines 1210 can include instructions that enable processor 1202 to perform the functions described herein, e.g., some or all of the methods of FIGS. 2-5. Any of software in memory 1204 can alternatively be stored on any other suitable storage location or computer-readable medium. In addition, memory 1204 (and/or other connected storage device(s)) can store images, color models, options, mask values, and other data used in the features described herein. Memory 1204 and any other type of storage (magnetic disk, optical disk, magnetic tape, or other tangible media) can be considered "storage devices."

I/O interface 1206 can provide functions to enable interfacing the device 1200 with other systems and devices. For example, network communication devices, storage devices such as memory and/or database 106, and input/output devices can communicate via interface 1206. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 12 shows one block for each of processor 1202, memory 1204, I/O interface 1206, and software blocks 1208 and 1210. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1200, such as processor(s) 1202, memory 1204, and I/O interface 1206. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images and other data as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:
1. A method comprising:
receiving one or more general color models of color distribution for a facial feature of persons depicted in a plurality of training images;
obtaining an input image;
determining a probability location mask in a feature region for each of one or more faces detected in the input image, the probability location mask indicating probabilities based on locations in the feature region and providing a higher probability at the center of the feature region than at the edges;
determining a feature mask associated with the facial feature for the one or more faces detected in the input image, wherein determining the feature mask uses the one or more general color models and the probability location mask and includes:
estimating one or more local color models for each of the one or more faces in the input image based on the one or more general color models; and refining the one or more estimated local color models for each of the one or more faces in the image based on the one or more general color models,
wherein the refined one or more local color models are used in the determination of the feature mask; and
applying a modification to the facial feature of at least one of the one or more faces in the input image using the feature mask.

2. The method of claim 1 wherein the facial feature is teeth.

3. The method of claim 1 wherein the of one or more general color models are determined and stored before the obtaining of the input image, and wherein the one or more general color models are Gaussian models including a first model for the colors of feature pixels in the facial feature and a second model for the colors of non-feature pixels that are not in the facial feature in the plurality of training images.

4. The method of claim 1 wherein the facial feature is teeth, and wherein the probability location mask is centered on a center of a detected mouth region.

5. The method of claim 4 wherein the probability location mask is a two-dimensional Gaussian gradient distribution having a probability of 1 in the center of the probability location mask and probabilities gradually falling to zero at the edges of the mouth region.

6. The method of claim 1 wherein estimating one or more local color models includes evaluating each pixel in a feature region of each of the one or more faces with the one or more general color models to determine a local feature color model for pixels depicting the facial feature and a local non-feature color model for pixels not depicting the facial feature.

7. The method of claim 6 wherein a pixel color of the input image is added to the local feature color model if the probability of the pixel being a feature pixel is over a predetermined threshold, and the pixel color is added to the local non-feature color model if the probability is under the predetermined threshold.

8. The method of claim 1 wherein the refining the one or more estimated local color models includes comparing and transforming data points of the one or more estimated local color models to the one or more general color models.

9. The method of claim 1 wherein the refining includes repeating for a number of times:
transforming the one or more local color models by aligning the centers and major bases of the one or more local color models and one or more of the corresponding general color models; and
evaluating each pixel in a feature region of a face using pixel values from the one or more transformed local color models fed to the one or more Response After Final corresponding general color models to determine a new local color model for feature pixels and a new local color model for non-feature pixels.

10. The method of claim 1 wherein one or more resulting color models result from the refining, and wherein determining the feature mask associated with each of the one or more faces includes using at least one of the one or more resulting color models to determine mask values in an individual feature mask for each of the one or more faces depicted in the input image.

11. The method of claim 10 wherein determining the feature mask includes merging the individual feature mask determined for each of the one or more faces into the feature mask.

12. A method comprising:
receiving one or more general color models of color distribution for a facial feature of persons depicted in a plurality of training images, wherein the facial feature is teeth;
obtaining an input image;
determining a probability location mask in a feature region, for each of one or more faces detected in the input image, the probability location mask indicating probabilities based on locations in the feature region;
determining a feature mask associated with the facial feature for the one or more faces detected in the input image, wherein determining the feature mask uses the one or more general color models and the probability location mask and includes:
estimating one or more local color models for each of the one or more faces in the input image based on the one or more general color models; and
refining the one or more estimated local color models for each of the one or more faces in the image based on the one or more general color models,
wherein the refined one or more local color models are used in the determination of the feature mask; and
applying a modification to the facial feature of at least one of the one or more faces in the input image using the feature mask, wherein the applying a modification includes a color change that includes at least one of:
reducing a saturation value of each teeth pixel; and
increasing a brightness value of each teeth pixel.

13. A system comprising:
a storage device; and
at least one processor accessing the storage device and operative to perform operations comprising:
receiving one or more general color models of color distribution for a facial feature of persons depicted in a plurality of training images;
obtaining an input image;
determining a feature mask associated with the facial feature of one or more faces detected in the input image, including:
estimating one or more local color models for each of the one or more faces in the input image based on the one or more general color models; and
refining the one or more estimated local color models for each of the one or more faces in the image, including transforming data points of the one or more estimated local color models to the one or more general color models, wherein the refined one or more local color models are used in the determination of the feature mask; and
applying a modification to the facial feature of at least one of the one or more faces in the input image using the feature mask,
wherein the at least one processor refines the estimated one or more local color models for each of the one or more faces including repeating for a number of times:
transforming the data points of the one or more local color models by aligning the centers and major bases of the one or more local color models and one or more corresponding general color models; and
evaluating each pixel in a feature region of a face using pixel values from the one or more transformed local color models fed to the one or more corresponding general color models to determine a new local color model for feature pixels and a new local color model for non-feature pixels.

14. The system of claim 13 wherein the at least one processor is further operative to perform:
determining a probability location mask in a feature region for each of the one or more faces detected in the input image, wherein the probability location mask provides a higher probability at the center of the feature region than at the edges, and wherein the determining the feature mask associated with the one or more faces in the input image uses the one or more general color models and the probability location mask.

15. The system of claim 13 wherein the at least one processor refines the one or more estimated color models by refining the one or more estimated local color models until an amount of changes in the one or more estimated local color models between successive iterations is below a threshold.

16. The system of claim 13 wherein the at least one processor estimates one or more local color models including evaluating each pixel in a feature region of each of the one or more faces with the one or more general color models to determine a local feature color model for pixels depicting the facial feature and a local non-feature color model for pixels not depicting the facial feature.

* * * * *